(12) United States Patent
Mizutani et al.

(10) Patent No.: US 12,442,757 B2
(45) Date of Patent: Oct. 14, 2025

(54) GAS MEASURING DEVICE AND GAS MEASURING METHOD

(71) Applicants: SINTOKOGIO, LTD., Nagoya (JP); National University Corporation TOYOHASHI UNIVERSITY OF TECHNOLOGY, Toyohashi (JP)

(72) Inventors: Manase Mizutani, Nagoya (JP); Toshihiko Noda, Toyohashi (JP); Kazuaki Sawada, Toyohashi (JP)

(73) Assignees: SINTOKOGIO, LTD., Nagoya (JP); National University Corporation TOYOHASHI UNIVERSITY OF TECHNOLOGY, Toyohashi (JP)

( * ) Notice: Subject to any disclaimer, the term of this patent is extended or adjusted under 35 U.S.C. 154(b) by 223 days.

(21) Appl. No.: 18/197,947

(22) Filed: May 16, 2023

(65) Prior Publication Data

US 2023/0408400 A1    Dec. 21, 2023

(30) Foreign Application Priority Data

Jun. 15, 2022    (JP) .................................. 2022-096776

(51) Int. Cl.
*G01N 21/21*    (2006.01)
(52) U.S. Cl.
CPC ................... *G01N 21/21* (2013.01)
(58) Field of Classification Search
CPC ......... G01N 21/21; G01N 21/05; G01N 21/31
See application file for complete search history.

(56) References Cited

U.S. PATENT DOCUMENTS

| 5,822,067 A | 10/1998 | Yanik |
| 2005/0094144 A1* | 5/2005 | Gibbs .................... G01N 21/21 |
| | | 356/365 |

(Continued)

FOREIGN PATENT DOCUMENTS

| JP | 2020-041833 A | 3/2020 | |
| WO | WO-2021001407 A1 * | 1/2021 | ............. G01N 21/21 |

OTHER PUBLICATIONS

European Office Action issued Sep. 20, 2024 in Application No. 23175029.0.

(Continued)

*Primary Examiner* — Jonathan M Hansen
(74) *Attorney, Agent, or Firm* — Faegre Drinker Biddle & Reath LLP (57) ABSTRACT

A gas measuring device includes a gas chamber into which a sample gas containing a target gas is introduced, a gas detection unit configured to detect the target gas contained in the sample gas introduced into the gas chamber, an irradiation unit configured to apply polarized light to the sample gas introduced into the gas chamber using a polarizer, an optical rotation measurement unit configured to measure optical rotation between the polarized light applied from the irradiation unit to the sample gas and the polarized light that has been transmitted through the sample gas using an analyzer, and an output unit configured to output information on the target gas detected by the gas detection unit and information on the optical rotation of the polarized light detected by the optical rotation measurement unit in association with each other.

6 Claims, 7 Drawing Sheets

(56) References Cited

U.S. PATENT DOCUMENTS

2013/0258336 A1* 10/2013 Ostermeyer ....... G01N 21/8806
                                                        356/440
2013/0342210 A1* 12/2013 Stokely ................ E21B 47/022
                                                        324/346

OTHER PUBLICATIONS

Extended European Search Report issued Nov. 21, 2023 in Application No. 23175029.0.
Bougas Lykourgos et.al., "Absolute optical chiral analysis using cavity-enhanced polarimetry," Retrieved from the Internet: URL:https://chemrxiv.org/engage/api-gateway/chemrxiv/assets/orp/resource/item/615afc21b564b67e6a6bec45/original/absolute-optical-chiralanalysis-using-cavity-enhanced-polarimetry.pdf, Oct. 5, 2021, p.1-p.25, XP55877300.

* cited by examiner

GAS MEASURING DEVICE AND GAS MEASURING METHOD

CROSS-REFERENCE TO RELATED APPLICATION

This application is based on Japanese Application No. 2022-096776 filed with Japan Patent Office on Jun. 15, 2022, the entire contents of which are hereby incorporated by reference.

TECHNICAL FIELD

The present disclosure relates to a gas measuring device and a gas measuring method.

BACKGROUND

Japanese Unexamined Patent Publication No. 2020-041833 discloses a gas measuring device. This gas measuring device measures a target gas contained in a sample gas on the basis of a resistance value of a metal oxide semiconductor during heating. The target gas includes volatile organic compounds such as toluene and formaldehyde.

SUMMARY

A compound of an odor component, which is a target gas, may contain a pair of optical isomers. Optical isomers are also called enantiomers. Optical isomers have molecular structures having a relationship of being mirror images of each other. Optical isomers include, for example, a d-form and an l-form. Optical isomers have the same physical properties such as a melting point, a boiling point, and a density, and basic chemical properties as each other, but have different physiological effects from each other. The physiological effects are, for example, a taste, a smell, or the like. Therefore, in order to determine an odor, it is necessary to distinguish between the d-form and the l-form. However, since optical isomers have the same physical properties and chemical properties as each other, there is a likelihood that the gas measuring device described in Japanese Unexamined Patent Publication No. 2020-041833 will not be able to distinguish between the d-form and the l-form. The present disclosure provides a gas measuring device capable of distinguishing optical isomers.

A gas measuring device according to one aspect of the present disclosure includes a gas chamber, a gas detection unit, an irradiation unit, an optical rotation measurement unit, and an output unit. A sample gas containing a target gas is introduced into the gas chamber. The gas detection unit configured to detect the target gas contained in the sample gas introduced into the gas chamber. The irradiation unit configured to apply polarized light to the sample gas introduced into the gas chamber using a polarizer. The optical rotation measurement unit configured to measure optical rotation between the polarized light applied from the irradiation unit to the sample gas and the polarized light that has been transmitted through the sample gas using an analyzer. The output unit configured to output information on the target gas detected by the gas detection unit and information on the optical rotation of the polarized light measured by the optical rotation measurement unit in association with each other.

In the gas measuring device, the target gas contained in the sample gas is detected by the gas detection unit. Thereby, the target gas is detected in the gas chamber. The polarized light applied from the irradiation unit is transmitted through the sample gas. The optical rotation of the polarized light before and after being transmitted through the sample gas is measured by the optical rotation measurement unit. If gas molecules forming the target gas have optical isomers, since a d-form and an l-form have different optical rotations from each other, the d-form and the l-form have different rotation directions in optical rotation. Therefore, information on the optical rotation of the polarized light includes information on optical isomers forming the target gas between the d-form and the l-form. If optical isomers are contained in the gas molecules forming the target gas, which optical isomers from the d-form or the l-form are contained in the target gas can be distinguished by associating the information on the target gas detected by the gas detection unit with the information on the optical rotation of the polarized light. Therefore, this gas measuring device can distinguish optical isomers.

In one embodiment, the optical rotation measurement unit and the gas detection unit may be configured by one semiconductor sensor. One semiconductor sensor may be configured to respond to both light and gas. In this case, the gas measuring device can realize a simple configuration compared to a case in which the optical rotation measurement unit and the gas detection unit are configured with different sensors.

In one embodiment, the gas measuring device may include an optical splitting unit. The optical splitting unit may optically split the polarized light applied to the sample gas into a plurality of polarized lights. The optical rotation measurement unit may measure optical rotation between the polarized light applied from the irradiation unit to the sample gas and each of the plurality of polarized lights that have been optically split by the optical splitting unit and transmitted through the sample gas. In this case, the polarized light applied from the irradiation unit to the sample gas is optically split into the plurality of polarized lights with different wavelengths by the optical splitting unit. The optical rotation of optical isomers differs depending on a wavelength of the polarized light. Therefore, this gas device can distinguish optical isomers in more detail than when the optical rotation is measured on the basis of polarized light of a single wavelength.

In one embodiment, the gas measuring device may include a gas introduction part and an airflow control unit. The gas introduction part may form a gas flow of the sample gas in the gas chamber. The airflow control unit may have a plurality of openings through which the sample gas passes. The gas detection unit may detect the target gas contained in the sample gas that has passed through the openings of the airflow control unit. In this case, a flow direction of the sample gas and a flow rate of the sample gas are stabilized by a rectifying action of the plurality of openings. Therefore, the gas measuring device can realize stable detection of the target gas.

In one embodiment, the airflow control unit may optically split the polarized light that has been transmitted through the sample gas into a plurality of polarized lights. The optical rotation measurement unit may measure optical rotation between the polarized light applied from the irradiation unit to the sample gas and each of the plurality of polarized lights that have been optically split by the airflow control unit and transmitted through the sample gas. In this case, since the airflow control unit has a function of the optical splitting unit, the gas measuring device can realize a simple configuration compared to a configuration in which the airflow control unit and the optical splitting unit are separately provided.

A gas measuring method according to another aspect of the present disclosure includes the following steps (1) to (5). This gas measuring method has the same effects as the gas measuring device described above.

(1) An introduction step of introducing a sample gas containing a target gas into a gas chamber.
(2) A gas detection step of detecting the target gas contained in the sample gas introduced into the gas chamber.
(3) An irradiation step of applying polarized light to the sample gas introduced into the gas chamber.
(4) A light detection step of measuring optical rotation between the polarized light applied to the sample gas and the polarized light that has been transmitted through the sample gas.
(5) An output step of outputting information on the target gas detected in the gas detection step and information on the optical rotation of the polarized light detected in the light detection step in association with each other.

According to the present disclosure, it is possible to distinguish optical isomers.

DETAILED DESCRIPTION

Hereinafter, embodiments of the present disclosure will be described with reference to the drawings. Further, in the following description, the same elements or elements having the same functions will be denoted by the same reference signs and duplicate descriptions thereof will be omitted. Dimensional proportions in the drawings do not necessarily coincide with those of the description. The terms "upper," "lower," "left," and "right" are those based on states of the illustrations and are for convenience.

[Gas Measuring Device]

Figure 1:
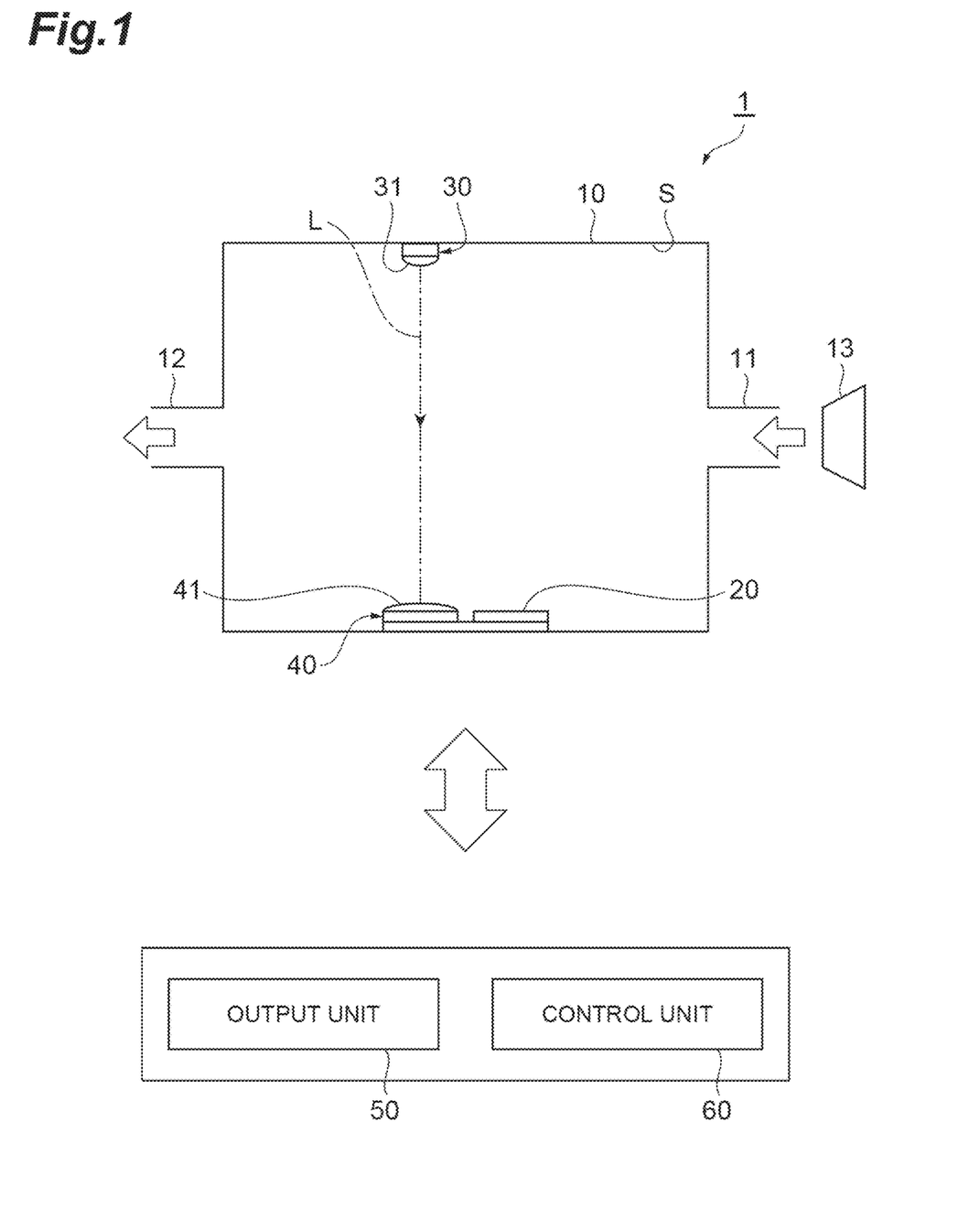
FIG. 1 is a cross-sectional configuration view illustrating a gas measuring device according to one embodiment.
Figure 2A:
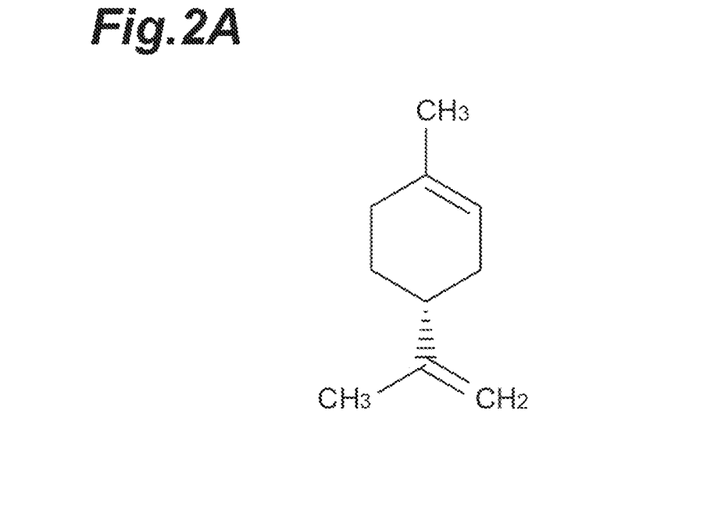
FIG. 2A is a structural formula showing (+) limonene of a d-form.
Figure 2B:
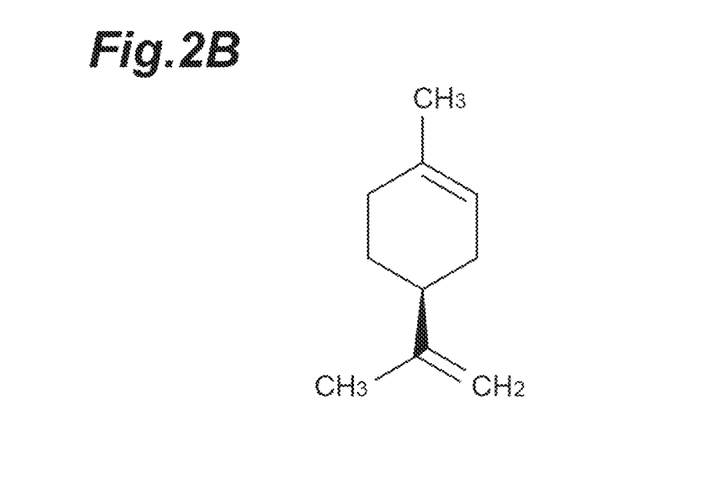
FIG. 2B is a structural formula showing (−) limonene of an l-form.

FIG. 1 is a cross-sectional configuration view illustrating a gas measuring device 1 according to one embodiment. The gas measuring device 1 illustrated in FIG. 1 detects a target gas. The target gas is, for example, odor components contained in the atmosphere. Gas components contained in the target gas may have optical isomers. Hereinafter, limonene ($C_{10}H_{16}$) will be described as an example of the target gas. Limonene has a pair of optical isomers including a d-form and an l-form. FIG. 2A is a structural formula showing (+) limonene of the d-form that exhibits dextrorotation. FIG. 2B is a structural formula showing (−) limonene of the l-form that exhibits levorotation. (+) Limonene and (−) limonene have the same physical properties such as a melting point, a boiling point, and a density, and the same basic chemical properties. However, (+) limonene is an odor component of lemons, oranges, or the like, whereas (−) limonene is an odor component of mint (+) Limonene and (−) limonene have different physiological effects on a smell from each other. The target gas is not limited to the limonene. The target gas may be terpenes. Terpenes, as an example, include limonene and α-pinene.

As illustrated in FIG. 1, the gas measuring device 1 includes a case 10 that defines a gas chamber S therein. An intake part 11 and an exhaust part 12 are provided in the case 10. The intake part 11 and the exhaust part 12 communicate with a gas chamber S. As an example, a sample gas containing the target gas can be introduced into the gas chamber S from the intake part 11. The sample gas is not particularly limited as long as it is a gas containing the target gas. For example, the sample gas may be atmospheric air or the like. The sample gas introduced into the gas chamber S can be exhausted from the exhaust part 12.

A gas introduction part 13 is provided in the intake part 11. The gas introduction part 13 introduces the sample gas into the gas chamber S and forms a gas flow of the sample gas inside the gas chamber S. The gas introduction part 13 is, for example, a pump, a compressor, or a blower.

The gas measuring device 1 includes a gas detection unit 20, an irradiation unit 30, an optical rotation measurement unit 40, an output unit and a control unit 60. The gas detection unit 20, the irradiation unit and the optical rotation measurement unit 40 are disposed inside the case 10. The gas detection unit 20 is a gas sensor that detects the target gas. The gas detection unit 20 may selectively respond to only the target gas, or may respond to a plurality of gases including the target gas. The gas detection unit 20 outputs information on the target gas as a detection result. The information on the target gas is, for example, types of the gas, a concentration, and the like. The gas detection unit 20 may output presence or absence of the target gas with a threshold value of a concentration of the target gas as a reference as the information on the target gas. The gas detection unit 20 may be any gas sensor such as a semiconductor type, an electrochemical type, a crystal oscillator type, or the like. Hereinafter, a semiconductor-type gas sensor that selectively responds to the target gas will be described as an example of the gas detection unit 20. The semiconductor-type gas sensor is configured by a semiconductor sensor. Types of the target gas and a concentration of the target gas are detected as an electrical signal.

The semiconductor sensor is, for example, a potential sensor configured by a plurality of sensor arrays. A sensitive film may be provided in the semiconductor sensor. The semiconductor sensor having a sensitive film detects the target gas as an electrical signal. The sensitive film contains, for example, polyaniline (PANT). The sensitive film may be formed of a plurality of sensitive films. The sensitive film is formed of, for example, a sensitive film to which sodium dodecyl benzene sulfonate (SDBS) is added, a sensitive film to which methane sulfonic acid (MSA) is added, and a sensitive film to which γ-cyclodextrin (γ-CD) is added.

The irradiation unit 30 is constituted by, for example, a light source and a polarizer 31. The light source is, for example, a sodium lamp. Further, the light source may be a mercury lamp, a halogen lamp, or an LED.

The polarizer 31 is an optical element that transmits polarized light vibrating in a predetermined vibration direction. The polarizer 31 is, for example, a polarizing plate. In the present embodiment, the polarizer 31 is provided in the irradiation unit 30 as an example. Light generated by the light source is incident on the polarizer 31. The polarizer 31 transmits polarized light L from the light. The sample gas is irradiated with the polarized light L through the polarizer 31. As described above, the irradiation unit 30 applies the polarized light to the sample gas introduced in the gas chamber S using the polarizer 31. Further, the polarizer 31 need not be provided integrally with the light source as physically one device, and may be provided separately from the light source.

The optical rotation measurement unit 40 is constituted by, for example, an analyzer 41, an encoder, and an optical sensor. The analyzer 41 is an optical element that transmits polarized light vibrating in a predetermined vibration direction. The analyzer 41 is provided to be rotatable around a rotation axis parallel to an optical path of the polarized light L. The analyzer 41 is, for example, a polarizing plate. The analyzer 41 may be a polarizing plate having the same configuration as that of the polarizer 31. The analyzer 41 may be supported by a rotation mechanism, and a rotation angle of the analyzer 41 may be measured by the encoder. Rotation of the analyzer 41 changes a vibration direction of light that can be transmitted through the analyzer 41. In the present embodiment, as an example, the analyzer 41 and the encoder are provided in the optical rotation measurement unit 40. The polarized light L that has been transmitted through the sample gas is incident on the analyzer 41. The polarized light L is transmitted through the analyzer 41 when it satisfies a condition of the vibration direction. The optical rotation measurement unit 40 is irradiated with the polarized light L that has been transmitted through the analyzer 41. Further, the analyzer 41 and the encoder need not be provided integrally with the optical sensor as one device, and may be provided separately from the optical sensor.

The optical sensor constituting the optical rotation measurement unit 40 includes, for example, a photoelectric element that detects light as an electrical signal. The optical sensor detects the polarized light that has been transmitted through the analyzer 41. The polarized light that has been transmitted through the analyzer 41 has an optical rotation represented by a rotation angle and a rotation direction of the analyzer 41. The rotation angle of the analyzer 41 indicates an optical rotation direction and an optical rotation angle of the polarized light L that has been transmitted through the sample gas. The optical rotation angle is represented by the rotation angle of the analyzer 41 with the vibration direction of the polarized light L transmitted through the polarizing plate of the polarizer 31 as a reference.

For example, first, a vibration direction of the polarized light L applied to the sample gas through the polarizer 31 is set as a reference angle. A state in which a direction of the polarizer 31 and a direction of the analyzer 41 are aligned may be set as the reference angle. When the analyzer 41 is positioned at the reference angle, an encoder angle is set to 0 degrees.

The polarized light L that has been transmitted through the sample gas and the analyzer 41 is incident on the optical rotation measurement unit 40. At this time, the rotation angle of the analyzer 41 is adjusted so that an output of the optical sensor that detects light as an electrical signal is maximized. The rotation angle of the analyzer 41 at which the output of the optical sensor is maximized indicates an optical rotation between the polarized light L applied to the sample gas via the polarizer 31 and the polarized light L that has been transmitted through the sample gas and the analyzer 41. In this way, the optical rotation between the polarized light L applied to the sample gas and the polarized light L that has been transmitted through the sample gas is measured on the basis of a rotation position (rotation angle) of the analyzer 41 and a measurement result of the optical rotation measurement unit 40. As described above, the optical rotation measurement unit 40 measures the optical rotation between the polarized light L applied to the sample gas from the irradiation unit 30 and the polarized light L that has been transmitted through the sample gas using the analyzer 41.

As an example, the encoder provided in the analyzer 41 detects the rotation angle and the rotation direction of the analyzer 41 when the output of the optical rotation measurement unit 40 is maximized. The rotation angle and the rotation direction of the analyzer 41 detected by the encoder are acquired as information on the optical rotation of the polarized light L. As described above, the optical rotation of the polarized light L may include information on the optical rotation such as a magnitude (degree) of the optical rotation and a direction of the optical rotation. The magnitude of the optical rotation may be a rotation angle of the analyzer 41 itself, or may be a numerical value derived from the rotation angle of the analyzer 41. The numerical value derived from the rotation angle of the analyzer 41 is, for example, a specific optical rotation. The information on the optical rotation of the polarized light L may be information indicating either the d-form or the l-form. Further, an operator or the like may measure the rotation angle and the rotation direction of the analyzer 41 when an output of the optical sensor of the optical rotation measurement unit 40 detecting light as an electrical signal is maximized.

The optical rotation measurement unit 40 and the gas detection unit 20 may be configured as one semiconductor sensor. That is, the optical rotation measurement unit 40 and the gas detection unit 20 may be disposed on the same substrate to constitute one semiconductor sensor as illustrated in FIG. 1. In this case, one semiconductor sensor is configured to respond to both light and a gas.

The output unit 50 associates information on the target gas detected by the gas detection unit 20 with information on the optical rotation of the polarized light L detected by the optical rotation measurement unit 40, and outputs the associated information. The "associating" refers to making the information on the optical rotation of the polarized light L corresponding to the information on the target gas referable or recognizable. The "outputting" includes not only displaying the associated information on a display or a paper medium but also storing the associated information in a magnetic recording medium such as a memory or an optical recording medium. For example, the output unit 50 outputs a concentration of the target gas, and a magnitude and a direction of the optical rotation in association with each other. The concentration of the target gas is an example of the information on the target gas. The magnitude and the direction of the optical rotation are an example of the information on the optical rotation of the polarized light L. The output unit 50 may output types of the target gas and information indicating either the d-form or the l-form in association with each other. For example, the output unit 50 may output information indicating either the (+) limonene or the (−) limonene. The output unit 50 may output information indicating either an odor of lemons (or an odor of oranges) or an odor of mint on the basis of the information indicating either the (+) limonene or the (−) limonene. A case of determining and outputting the odor in this way is also included in the form of outputting the information on the target gas and the information on the optical rotation of the polarized light L in association with each other. The control unit 60, as an example, includes a processor, a memory, a crystal oscillator, and an A/D converter. For example, the gas detection unit 20, the irradiation unit 30, the optical rotation measurement unit 40, and the output unit 50 can be controlled by the control unit 60.

Further, in the above-described embodiment, an example in which an encoder is provided in the optical rotation measurement unit 40 has been described, but the encoder may be provided in the irradiation unit 30. In this case, the optical rotation between the polarized light L applied to the sample gas and the polarized light L that has been transmitted through the sample gas is measured on the basis of the rotation position (rotation angle) of the polarizer 31 and the measurement result of the optical rotation measurement unit 40.

[Operation of Gas Measuring Device]

Figure 3:
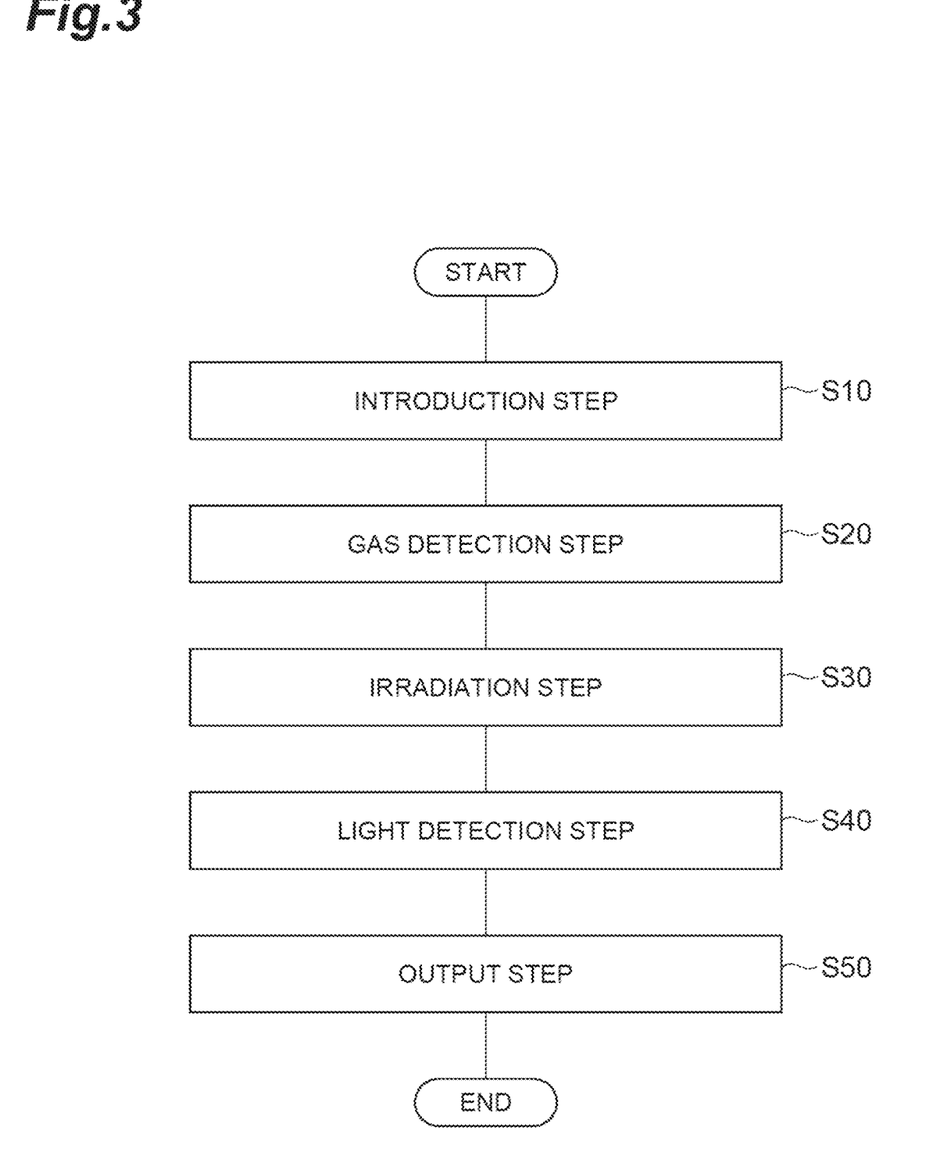
FIG. 3 is a flowchart showing an operation of the gas measuring device according to one embodiment.

FIG. 3 is a flowchart showing an example of the gas measuring method according to the embodiment. The steps of the flowchart shown in FIG. 3 show an operation of the gas measuring device 1. The target gas is limonene as an example.

As shown in FIG. 3, the gas measuring device 1 first introduces a sample gas containing a target gas (introduction step S10). For example, the control unit 60 of the gas measuring device 1 introduces the sample gas into the gas chamber S from the intake part 11. As a specific example, the control unit 60 operates the gas introduction part 13 of the gas measuring device 1 to introduce atmospheric air containing the target gas into the gas chamber S.

Next, the gas measuring device 1 detects the target gas contained in the sample gas introduced into the gas chamber S (gas detection step S20). For example, the control unit 60 of the gas measuring device 1 operates the gas detection unit 20 to detect a concentration of the target gas contained in the atmospheric air introduced into the gas chamber S as information on the target gas. Next, the gas measuring device 1 causes the sample gas introduced into the gas chamber S to be irradiated with the polarized light L (irradiation step S30). For example, the control unit 60 of the gas measuring device 1 operates the irradiation unit 30 to cause the atmospheric air introduced into the gas chamber S to be irradiated with the polarized light L.

Next, the gas measuring device 1 measures optical rotation between the polarized light L applied to the sample gas and the polarized light L that has been transmitted through the sample gas (light detection step S40). For example, the control unit 60 of the gas measuring device 1 operates the optical rotation measurement unit 40 while rotating the analyzer 41 to detect a magnitude and a direction of the optical rotation as information on the optical rotation of the polarized light L. As a specific example, the control unit 60 operates the optical rotation measurement unit 40 while rotating the analyzer 41 to cause the encoder to detect the rotation angle of the analyzer 41 when the output of the optical rotation measurement unit 40 is maximized.

Finally, the gas measuring device 1 outputs the information on the target gas detected in the gas detection step S20 and the information on the optical rotation of the polarized light L detected in the light detection step S40 in association with each other (output step S50). For example, the control unit 60 of the gas measuring device 1 operates the output unit to display the concentration of the target gas, and the magnitude and the direction of the optical rotation on a display. As described above, the flowchart shown in FIG. 3 ends.

Summary of Embodiment

In the gas measuring device 1, atmospheric air is introduced into the gas chamber S, and limonene contained in the atmospheric air is detected by the gas detection unit 20. Thereby, limonene is detected in the gas chamber S. In the gas chamber S, optical rotation due to limonene is detected by the optical rotation measurement unit 40. Since (+) limonene and (−) limonene, which are optical isomers of limonene, have different optical rotations from each other, the (+) limonene and the (−) limonene have different rotation directions in optical rotation. Therefore, the information on the optical rotation of the polarized light L detected by the optical rotation measurement unit 40 includes information indicating which optical isomer of the (+) limonene and the (−) limonene it is. If a direction of the optical rotation is right-handed rotation (clockwise), the (+) limonene is detected. If a direction of the optical rotation is left-handed rotation (counterclockwise), the (−) limonene is detected. In this way, the gas measuring device 1 can determine limonene having a relationship of optical isomers (enantiomers).

In the gas measuring device 1, the optical rotation measurement unit 40 and the gas detection unit 20 can be configured by one semiconductor sensor. Thereby, a simple configuration of the gas measuring device 1 is realized.

Modified Example

Figure 4:
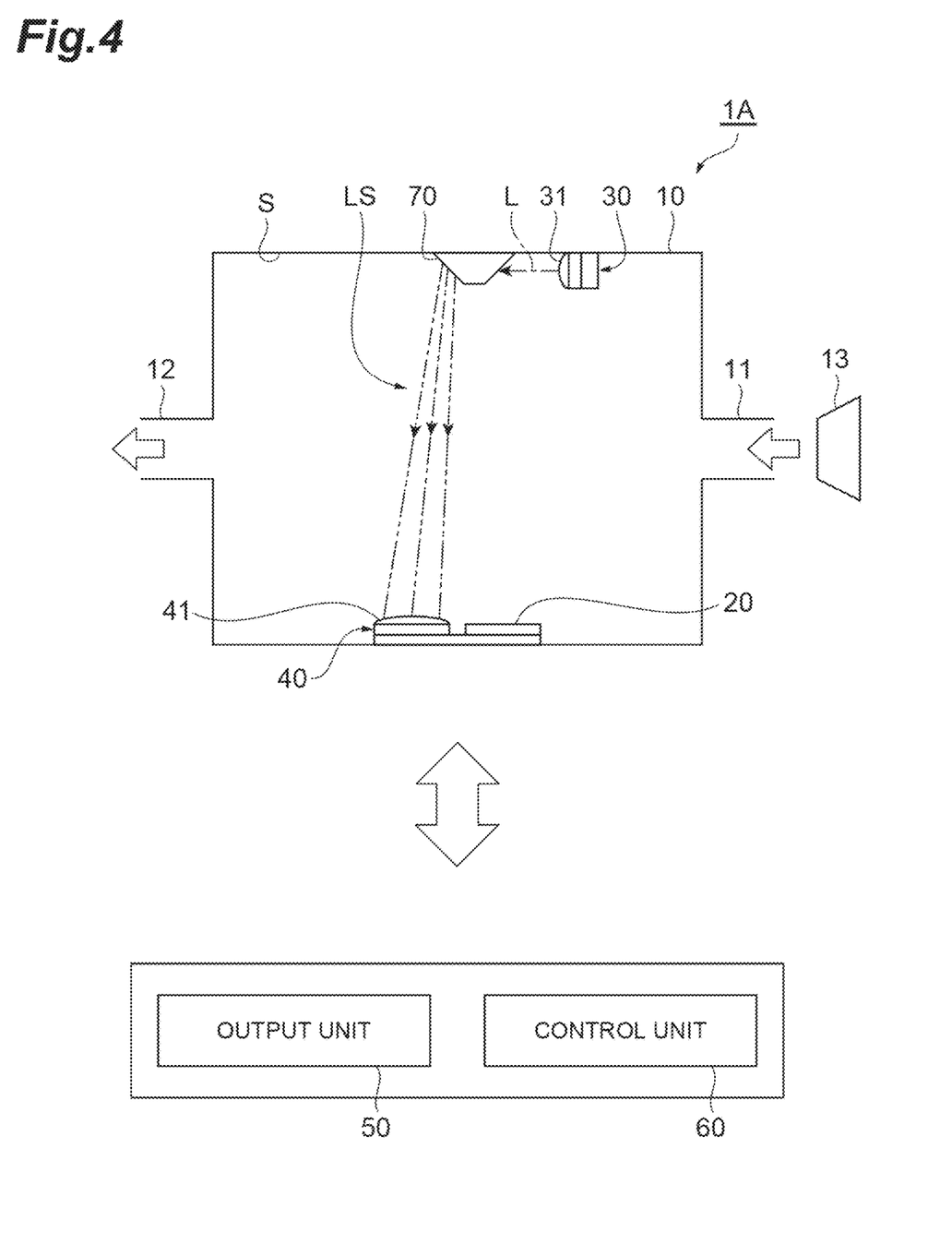
FIG. 4 is a cross-sectional configuration view illustrating a modified example of the gas measuring device according to the embodiment.

FIG. 4 is a cross-sectional configuration view illustrating a modified example of the gas measuring device according to the embodiment. A gas measuring device 1A illustrated in FIG. 4 is different from the gas measuring device 1 illustrated in FIG. 1 in that an optical splitting unit 70 is provided, and is otherwise the same. In the following description, differences will be mainly described, and duplicate descriptions thereof will be omitted.

The polarized light L to be applied to the sample gas is incident on the optical splitting unit 70 via the polarizer 31. The optical splitting unit 70 splits the incident polarized light L into a plurality of polarized lights LS. The optical splitting unit 70 is, for example, a prism. The irradiation unit 30 and the optical splitting unit 70 are disposed to face the optical rotation measurement unit 40 with the gas chamber S interposed therebetween. The polarized light L emitted from the polarizer 31 is incident on the optical splitting unit 70. The polarized light L incident on the optical splitting unit 70 is optically split into the plurality of polarized lights LS. The plurality of polarized lights LS are polarized lights with wavelengths different from each other. The plurality of polarized lights LS is transmitted through the sample gas, and then are incident on the optical rotation measurement unit 40.

Optical rotations between the polarized light L applied to the sample gas through the polarizer 31 and the plurality of polarized lights LS that have been optically split by the optical splitting unit 70 and transmitted through the sample gas and the analyzer 41 are each detected. For example, the plurality of polarized lights LS is incident on a plurality of regions of the optical rotation measurement unit 40. The plurality of regions may be regions divided for each of the plurality of polarized lights LS with different wavelengths. The plurality of regions may be regions divided more finely than the plurality of polarized lights LS. The plurality of sensor arrays described above are disposed in the plurality of regions. The optical rotations between the polarized light L applied to the sample gas through the polarizer 31 and the plurality of polarized lights LS transmitted through the sample gas are detected for each region (for each of the plurality of the polarized lights). The sensor arrays in the plurality of regions detect the optical rotations respectively corresponding to the plurality of polarized lights LS with different wavelengths. As a result, the gas measuring device 1A can provide a function of measuring optical rotations of the target gas with respect to the plurality of polarized lights LS with different wavelengths with a simple configuration. For example, a group of sensor arrays included in the sensor arrays of the plurality of regions can output according to optical rotation of a predetermined wavelength. Another group of sensor arrays included in the sensor arrays of the plurality of regions can output according to optical rotation of another wavelength. Thereby, the gas measuring device 1A can provide the function of measuring the optical rotations according to the polarized lights LS with different wavelengths as a single measuring device.

According to the gas measuring device 1A, the polarized light L applied to the sample gas via the polarizer 31 is optically split into the plurality of polarized lights LS with different wavelengths by the optical splitting unit 70. The optical rotation of optical isomers differs depending on a wavelength of the polarized light. As described above, the gas measuring device 1A detects the optical rotation corresponding to each of the plurality of polarized lights LS with different wavelengths. Therefore, the gas measuring device 1A can distinguish optical isomers in more detail.

According to the gas measuring device 1A, the polarized light L is transmitted through the optical splitting unit 70 and is optically split into the plurality of polarized lights LS with different wavelengths. A wavelength of light absorbed by the target gas differs depending on types of the target gas. Since the optical rotation measurement unit 40 measures optical rotation of the light transmitted through the target gas, the gas measuring device 1A can analyze the gas on the basis of the wavelength and the optical rotation of the light transmitted through the target gas.

Figure 5:
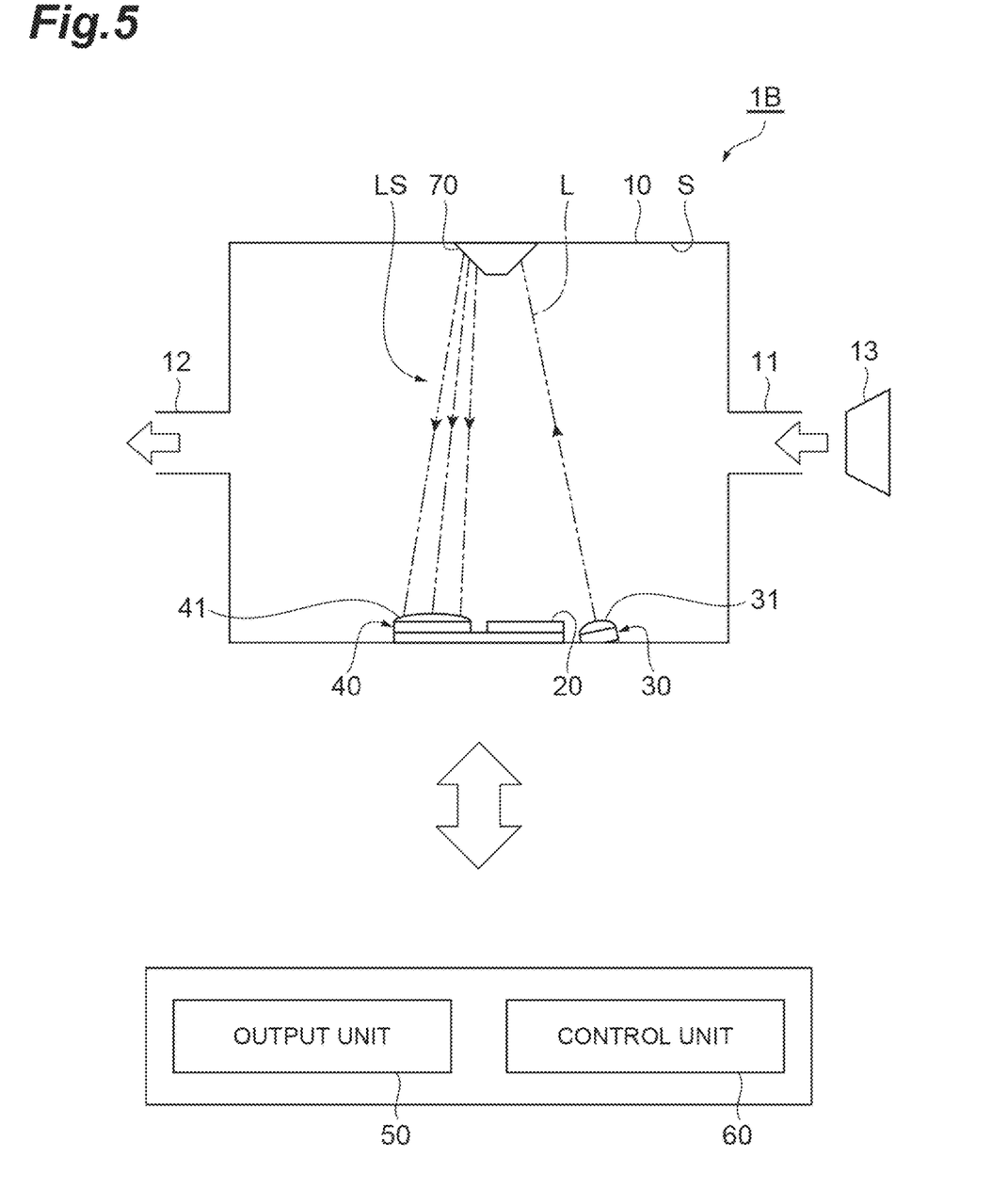
FIG. 5 is a cross-sectional configuration view illustrating a modified example of the gas measuring device according to the embodiment.

FIG. 5 is a cross-sectional configuration view illustrating a modified example of the gas measuring device according to the embodiment. A gas measuring device 1B illustrated in FIG. 5 is different from the gas measuring device 1A illustrated in FIG. 4 in position at which the optical splitting unit 70 is disposed, and is otherwise the same. In the following description, differences will be mainly described, and duplicate descriptions thereof will be omitted.

In the gas measuring device 1B, the optical splitting unit 70 is disposed to face the irradiation unit 30 and the optical rotation measurement unit 40 with the gas chamber S interposed therebetween. The polarized light L emitted from the irradiation unit 30 through the polarizer 31 is transmitted through the sample gas and is incident on the optical splitting unit 70. The polarized light L incident on the optical splitting unit 70 is optically split into a plurality of polarized lights LS. The plurality of polarized lights LS are polarized lights with wavelengths different from each other. The plurality of polarized lights LS is transmitted through the sample gas, transmitted through the analyzer 41, and then incident on the optical rotation measurement unit 40.

In the gas measuring device 1B, the polarized light L is transmitted through the sample gas, and then is incident on the optical splitting unit 70. The polarized light L is optically split into the plurality of polarized lights LS by the optical splitting unit 70, and then is incident on the sample gas again. Accordingly, the gas measuring device 1B has a longer optical path length for the polarized lights L and LS to be transmitted through the sample gas compared to that in the gas measuring device 1A. Therefore, the gas measuring device 1B can measure the optical rotation more accurately than the gas measuring device 1A. Thus, the gas measuring device 1B can distinguish optical isomers in more detail.

Figure 6:
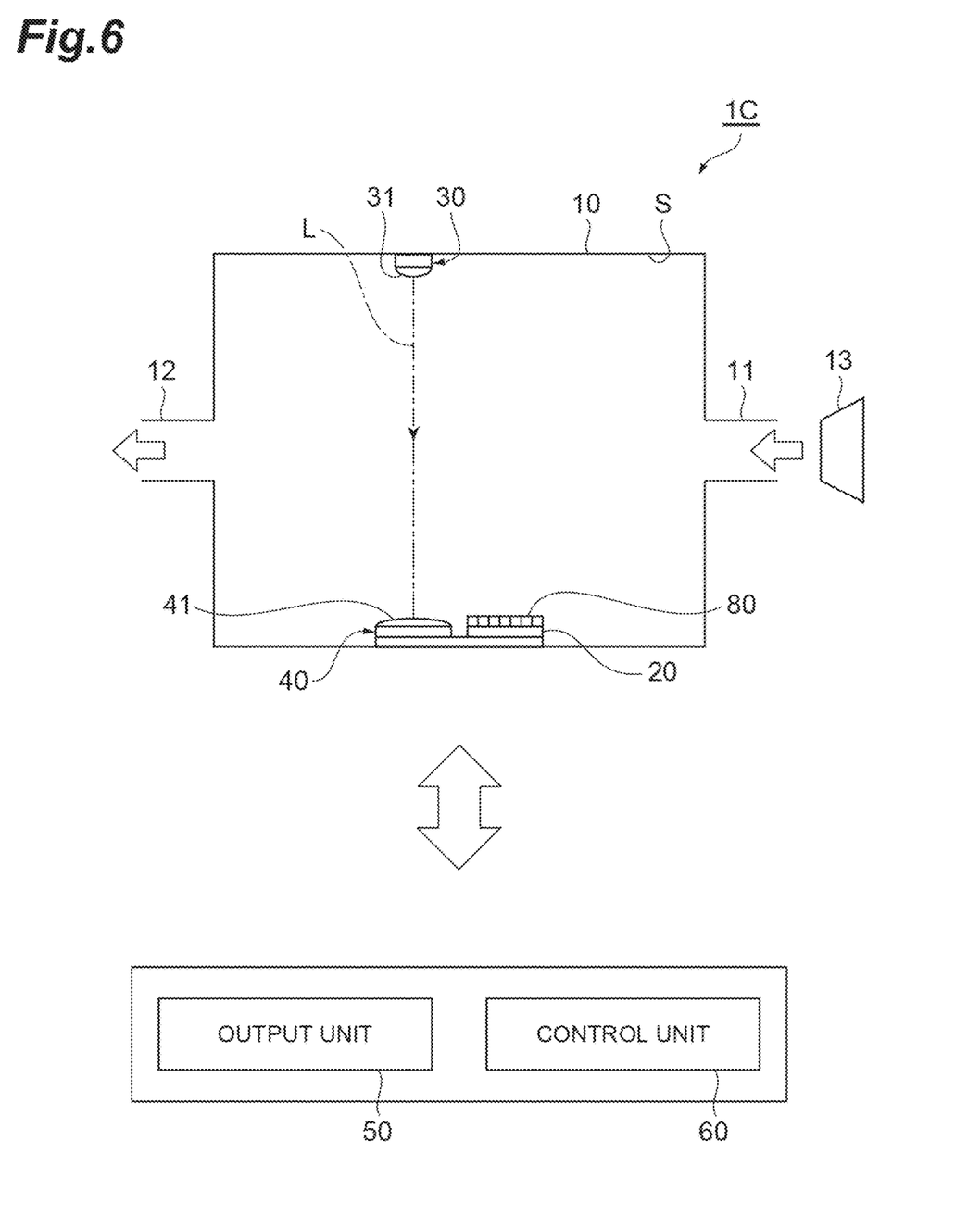
FIG. 6 is a cross-sectional configuration view illustrating a modified example of the gas measuring device according to the embodiment.

FIG. 6 is a cross-sectional configuration view illustrating a modified example of the gas measuring device according to the embodiment. A gas measuring device 1C illustrated in FIG. 6 is different from the gas measuring device 1 illustrated in FIG. 1 in that an airflow control unit 80 is provided, and is otherwise the same. In the following description, differences will be mainly described, and duplicate descriptions thereof will be omitted.

The airflow control unit 80 has a plurality of openings through which the sample gas passes. The plurality of openings forms a lattice-shaped grid. The airflow control unit 80 is disposed in a stage ahead of the gas detection unit 20, that is, between the gas detection unit 20 and an airflow of the sample gas. Thereby, the sample gas that has passed through the openings of the airflow control unit 80 reaches the gas detection unit 20. The sample gas is rectified by the openings of the airflow control unit 80 before it reaches the gas detection unit 20. Thereby, a flow direction and a flow rate of the sample gas reaching the gas detection unit 20 are stabilized. Therefore, the gas measuring device 1C can realize stable detection of the target gas.

The airflow control unit 80 may control a flow of the sample gas toward the gas detection unit 20 by opening and closing the plurality of openings. The airflow control unit 80 includes a MEMS (Micro Electro Mechanical Systems) actuator. The plurality of openings is opened and closed by an operation of the MEMS actuator. For example, when an amount of the sample gas flowing toward the gas detection unit 20 is large, the plurality of openings may be controlled to close, and when an amount of the sample gas flowing toward the gas detection unit 20 is small, the plurality of openings may be controlled to open.

The airflow control unit 80 can control a molecular weight of gas molecules directed toward the gas detection unit 20. When the plurality of openings each form a relatively small space at equal intervals, gas molecules pass through the plurality of openings in descending order of kinetic energy in a direction passing through the plurality of openings. For example, a heavier gas molecule with a larger molecular weight indicates that it can reach the gas detection unit 20 relatively early.

When the plurality of openings each form a relatively large space at equal intervals, gas molecules pass through the plurality of openings regardless of kinetic energy in a direction passing through the plurality of openings. A lighter gas molecule with a smaller molecular weight indicates that it can reach the gas detection unit 20 relatively early compared to a case in which the plurality of openings each form a relatively small space at equal intervals. Further, the plurality of openings may be subjected to a coating that has selectivity for one of the optical isomers. As described above, the gas measuring device 1C can perform a gas analysis based on two characteristics of optical rotation of gas molecules and a molecular weight of gas molecules. The gas measuring device 1C can perform a gas analysis of a gas mixture containing a plurality of types of target gases.

Figure 7:
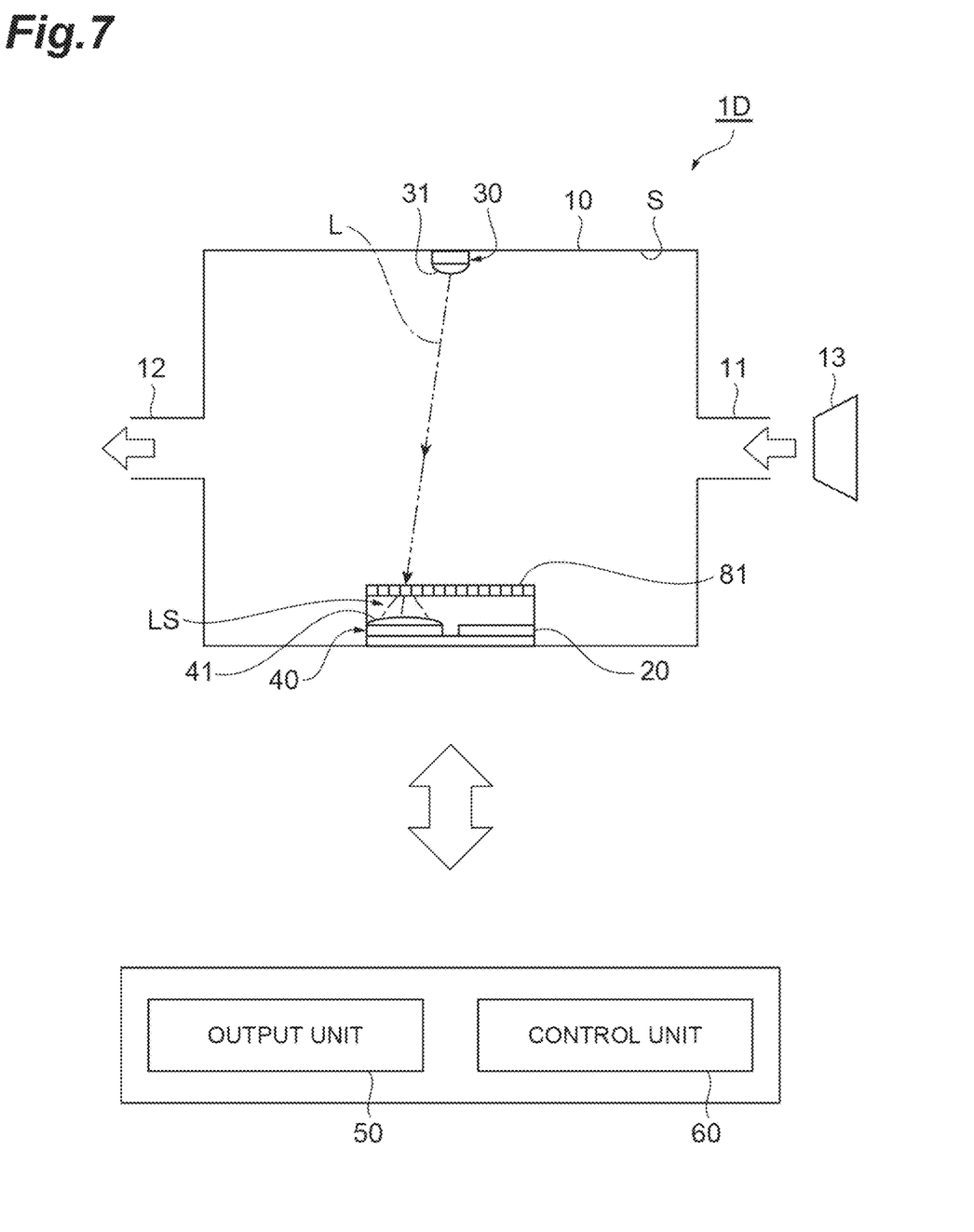
FIG. 7 is a cross-sectional configuration view illustrating a modified example of the gas measuring device according to the embodiment.

FIG. 7 is a cross-sectional configuration view illustrating a modified example of the gas measuring device according to the embodiment. A gas measuring device 1D illustrated in FIG. 7 is different from the gas measuring device 1 illustrated in FIG. 1 in that an airflow control unit 81 is provided, and is otherwise the same. In the following description, differences will be mainly described, and duplicate descriptions thereof will be omitted.

As an example, the airflow control unit 81 is disposed in a stage ahead of the gas detection unit 20 and the optical rotation measurement unit 40, that is, between the gas detection unit 20 and the optical rotation measurement unit 40, and an airflow of the sample gas. Thereby, the sample gas that has passed through a plurality of openings of the airflow control unit 81 reaches the gas detection unit 20, and the polarized light L that has been transmitted through the sample gas is incident on the optical rotation measurement unit 40 via the airflow control unit 81 and the analyzer 41. The airflow control unit 81 optically splits the polarized light L incident on the airflow control unit 81 into a plurality of polarized lights LS. The plurality of polarized lights LS optically split by the airflow control unit 81 are transmitted through the analyzer 41 and then incident on the optical rotation measurement unit 40. The airflow control unit 81 is formed of, for example, a material having optical transparency such as silicon (Si). The airflow control unit 81 may be formed of a resin or quartz. As described above, the airflow control unit 81 has functions of the optical splitting unit 70 and the airflow control unit 80 described above. That is, the plurality of openings forming the lattice-shaped grid can have a function of the optical splitting unit 70 described above.

Optical rotations between the polarized light L applied to the sample gas through the polarizer 31 and the plurality of polarized lights LS that have been transmitted through the sample gas and optically split by the airflow control unit 81 are each detected. As described above, since the airflow control unit 81 has functions of the optical splitting unit and the airflow control unit 80, the gas measuring device 1D can be realized with a simple configuration. The gas measuring device 1D can perform a gas analysis based on optical rotation of gas molecules for a plurality of wavelengths and a molecular weight of gas molecules.

Although various exemplary embodiments have been described above, the present disclosure is not limited to the above-described embodiments, and various omissions, substitutions, and modifications may be made.

For example, when the sample gas is confined in the gas chamber S, the gas measuring device 1 does not need to include the gas introduction part 13. When the gas chamber S is filled with the sample gas in advance, the gas measuring device 1 does not need to include the gas introduction part 13. The gas introduction part 13 may be provided in the exhaust part 12. In this case, the gas introduction part 13 has a function of suctioning the sample gas.

The gas measuring device may have a transparent gas adsorbent. The transparent gas adsorbent is disposed in the gas chamber. As an example, the transparent gas adsorbent is silica gel. The sample gas is adsorbed to the transparent gas adsorbent. In the sample gas adsorbed to the transparent gas adsorbent, a density of gas molecules is increased. In a configuration having the transparent gas adsorbent, the polarized light applied from the irradiation unit is transmitted through the transparent gas adsorbent to which the sample gas is adsorbed.

What is claimed is:

1. A gas measuring device comprising:
   a case that defines a gas chamber;
   the gas chamber into which a sample gas containing a target gas is introduced;
   a gas sensor configured to detect the target gas contained in the sample gas introduced into the gas chamber;
   a light source configured to apply polarized light to the sample gas introduced into the gas chamber using a polarizer;
   an optical sensor configured to measure optical rotation between the polarized light applied from the light source to the sample gas and the polarized light that has been transmitted through the sample gas using an analyzer; and
   an output module configured to output information on the target gas detected by the gas sensor and information on the optical rotation of the polarized light detected by the optical sensor in association with each other,
   wherein the gas sensor, the light source and the optical sensor are disposed inside the case.

2. The gas measuring device according to claim 1, wherein
   the optical sensor and the gas sensor are configured by one semiconductor sensor, and
   the one semiconductor sensor is configured to respond to both light and gas.

3. The gas measuring device according to claim 1, comprising:
   an optical splitter configured to optically split the polarized light applied from the light source to the sample gas into a plurality of polarized lights,
   wherein the optical sensor measures optical rotation between the polarized light applied from the light source to the sample gas and each of the plurality of polarized lights that have been optically split by the optical splitter and transmitted through the sample gas.

4. The gas measuring device according to claim 1 further comprising:
   a gas introduction part configured to form a gas flow of the sample gas in the gas chamber; and
   an airflow controller having a plurality of openings through which the sample gas passes,
   wherein the gas sensor is configured to detect the target gas contained in the sample gas that has passed through the openings of the airflow controller.

5. The gas measuring device according to claim 4, wherein
   the airflow controller is optically configured to split the polarized light that has been transmitted through the sample gas into a plurality of polarized lights, and
   the optical sensor is configured to measure optical rotation between the polarized light applied from the light source to the sample gas and each of the plurality of polarized lights that have been optically split by the airflow controller.

6. A gas measuring method comprising:
   an introduction step of introducing a sample gas containing a target gas into a gas chamber defined by a case;
   a gas detection step of detecting with a gas sensor the target gas contained in the sample gas introduced into the gas chamber;
   an irradiation step of applying with a light source polarized light to the sample gas introduced into the gas chamber;
   a light detection step of measuring with an optical sensor optical rotation between the polarized light applied to the sample gas and the polarized light that has been transmitted through the sample gas; and
   an output step of outputting information on the target gas detected in the gas detection step and information on the optical rotation of the polarized light detected in the light detection step in association with each other,
wherein the gas detection sensor, the light source and the optical sensor are disposed inside the case that defines a gas chamber therein.

\* \* \* \* \*